United States Patent
Bruck

(10) Patent No.: US 9,273,562 B2
(45) Date of Patent: Mar. 1, 2016

(54) PROJECTION RESISTANCE WELDING OF SUPERALLOYS

(75) Inventor: Gerald J. Bruck, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 360 days.

(21) Appl. No.: 13/352,468

(22) Filed: Jan. 18, 2012

(65) Prior Publication Data

US 2013/0115480 A1      May 9, 2013

Related U.S. Application Data

(60) Provisional application No. 61/556,387, filed on Nov. 7, 2011.

(51) Int. Cl.
*B23K 9/00* (2006.01)
*B23K 26/00* (2014.01)
(Continued)

(52) U.S. Cl.
CPC . *F01D 5/28* (2013.01); *B23K 11/14* (2013.01); *B23K 11/18* (2013.01); *B23P 6/005* (2013.01);
(Continued)

(58) Field of Classification Search
CPC .. B23K 11/002; B23K 11/20; B23K 11/0013; B23K 9/291; B23K 9/22; B23K 9/32; B23K 26/0656; B23K 26/246; B23K 9/013; B23K 11/14; B23K 11/18; B23K 11/003; B23K 11/004; B23K 2201/001; B23K 2203/08; C21D 10/005; B05B 7/226; B23P 6/005; F01D 5/005
USPC ................... 219/78.01, 117, 118, 75, 121.73, 219/121.85, 121.64, 96, 76.13, 76.16, 136, 219/117.1, 69.1
See application file for complete search history.

(56) References Cited

U.S. PATENT DOCUMENTS

| | | |
|---|---|---|
| 1,592,609 A | 7/1926 | Mattice |
| 2,629,803 A | 2/1953 | Bondley |

(Continued)

FOREIGN PATENT DOCUMENTS

| | | |
|---|---|---|
| DE | 4447403 | 1/1996 |
| DE | 4411680 | 8/1996 |

(Continued)

OTHER PUBLICATIONS

U.S. Appl. No. 13/571,754, filed Aug. 10, 2012, entitled "Stud Welding Repair of Superalloy Components", (Siemens-158).

(Continued)

*Primary Examiner* — Dana Ross
*Assistant Examiner* — Hemant Mathew

(57) ABSTRACT

Superalloy components are joined by mating a recess formed in one component with a corresponding projection formed in another component along a contact surface. The components are compressed along the contact surface and resistance heat welded to each other. Current is passed between the components at a selected flow rate and application time until localized melting occurs along the contact surface, and they are mutually affixed to each other. When repairing a damaged surface portion of a superalloy material component, the damaged portion is removed to form an excavated recess. A repair splice is formed, preferably of a same material with similar mechanical structural properties, having a mating projection with profile conforming to the corresponding recess profile. The splice and substrate are resistance heat welded under compression pressure until localized melting occurs along the contact surface, so that they are mutually affixed.

13 Claims, 4 Drawing Sheets

(51) Int. Cl.
*F01D 5/28* (2006.01)
*B23K 11/14* (2006.01)
*B23K 11/18* (2006.01)
*B23P 6/00* (2006.01)
*F01D 5/00* (2006.01)
*B23K 9/013* (2006.01)
*B23K 26/24* (2014.01)

(52) U.S. Cl.
CPC ............... *F01D 5/005* (2013.01); *B23K 9/013* (2013.01); *B23K 26/246* (2013.01); *B23K 2201/001* (2013.01); *B23K 2203/08* (2013.01); *F05D 2230/23* (2013.01); *F05D 2230/232* (2013.01); *F05D 2230/80* (2013.01); *F05D 2240/30* (2013.01); *F05D 2300/175* (2013.01); *Y10T 428/12493* (2015.01)

(56) References Cited

U.S. PATENT DOCUMENTS

| | | | |
|---|---|---|---|
| 3,119,632 A * | 1/1964 | Skinner | 285/148.12 |
| 3,487,530 A | 1/1970 | Ely | |
| 4,912,295 A * | 3/1990 | Arimochi et al. | 219/104 |
| 4,924,054 A | 5/1990 | Marcie et al. | |
| 5,033,334 A | 7/1991 | Phaal et al. | |
| 5,479,704 A * | 1/1996 | Richter et al. | 29/889.1 |
| 5,609,776 A | 3/1997 | Li | |
| 5,961,853 A | 10/1999 | Thornton | |
| 6,210,635 B1 * | 4/2001 | Jackson et al. | 420/445 |
| 6,213,379 B1 | 4/2001 | Takeshita et al. | |
| 6,327,766 B1 | 12/2001 | Cardente | |
| 6,413,650 B1 | 7/2002 | Dupree et al. | |
| 6,908,288 B2 | 6/2005 | Jackson et al. | |
| 6,994,920 B2 * | 2/2006 | Trewiler | 428/670 |
| 7,156,280 B1 | 1/2007 | Jiang et al. | |
| 8,158,903 B2 * | 4/2012 | Meier | 219/121.63 |
| 8,398,374 B2 | 3/2013 | Roberts et al. | |
| 9,186,740 B2 * | 11/2015 | Bruck | B23K 1/0004 |
| 2002/0139794 A1 | 10/2002 | Budinger | |
| 2004/0134887 A1 | 7/2004 | Murphy | |
| 2005/0092717 A1 * | 5/2005 | Trewiler | 219/96 |
| 2007/0034676 A1 | 2/2007 | Zhang et al. | |
| 2008/0237306 A1 * | 10/2008 | Sathian | 228/119 |
| 2009/0026182 A1 | 1/2009 | Hu et al. | |
| 2009/0140030 A1 | 6/2009 | Amancherla et al. | |
| 2009/0266870 A1 * | 10/2009 | Yousefiani et al. | 228/112.1 |
| 2010/0135812 A1 | 6/2010 | Cairo et al. | |
| 2011/0031223 A1 | 2/2011 | Belanger | |
| 2011/0062219 A1 | 3/2011 | Bezaire et al. | |
| 2011/0168679 A1 * | 7/2011 | Qi et al. | 219/75 |
| 2011/0233293 A1 | 9/2011 | Kral et al. | |
| 2012/0063894 A1 | 3/2012 | Chen et al. | |
| 2012/0205014 A1 | 8/2012 | Bruck et al. | |
| 2013/0081269 A1 | 4/2013 | Trapp et al. | |
| 2013/0115091 A1 | 5/2013 | Bruck et al. | |
| 2013/0115477 A1 | 5/2013 | Bruck et al. | |
| 2013/0260178 A1 | 10/2013 | Sansom et al. | |
| 2013/0263434 A1 | 10/2013 | Gugel | |
| 2014/0044984 A1 | 2/2014 | Bruck | |

FOREIGN PATENT DOCUMENTS

| | | |
|---|---|---|
| EP | 0191300 | 8/1986 |
| EP | 1527839 A1 | 5/2005 |
| EP | 2369131 | 9/2011 |
| EP | 2492044 | 8/2012 |
| FR | 2619331 A1 | 2/1989 |
| GB | 136846 | 10/1974 |
| JP | 356021736 A | 2/1981 |
| JP | 62199260 | 9/1987 |

OTHER PUBLICATIONS

Translation of DE 4411680 (EP0676259).
U.S. Appl. No. 13/352,475, filed Jan. 18, 2012, entitled Projection Resistance Brazing of Superalloys, (Siemens-144)—Application Allowed.
U.S. Appl. No. 13/561,174, filed Jul. 30, 2012, entitled Method for Resistance Braze Repair, (Siemens-155)—Under Non-final Rejection.
U.S. Appl. No. 13/571,754, filed Aug. 10, 2012, entitled Stud Welding Repair of Superalloy Components, (Siemens-158)—Now U.S. Pat. No. 9,085,042, issued Jul. 21, 2015.
Machine translation of European Patent document No. 191,300, published Apr. 2015.

* cited by examiner

PROJECTION RESISTANCE WELDING OF SUPERALLOYS

CLAIM TO PRIORITY

This application claims the benefit of United States provisional patent application entitled "Projection Resistance Welding of Superalloys with Powdered Filler", filed Nov. 7, 2011, and assigned Ser. No. 61/556,387, which is incorporated by reference herein.

BACKGROUND OF THE DISCLOSURE

1. Field of the Invention

The invention relates to structural joining of advanced superalloy components during fabrication and/or repair. In some embodiments, the invention relates to surface repair of superalloy turbine blades and vanes in steam or gas turbines, by use of splice inserts that are affixed to a new or repaired substrate by projection resistance heat welding under contact pressure, in a manner that does not significantly reduce mechanical structural or material properties of the joined components.

2. Description of the Prior Art

"Structural" repair of gas turbine or other superalloy components is commonly recognized as replacing damaged material with matching alloy material and achieving properties, such as strength, that are close to the original manufacture component specifications (e.g., seventy percent ultimate tensile strength of the original specification). For example, it is preferable to perform structural repairs on turbine blades that have experienced surface cracks, so that risk of further cracking is reduced, and the blades are restored to original material structural and dimensional specifications.

Structural repair or new fabrication of nickel and cobalt based superalloy material that is used to manufacture turbine components, such as cast turbine blades, is challenging, due to the metallurgic properties of the finished blade material. For example, as shown in FIG. 1, a superalloy having more than 6% aggregate aluminum or titanium content, such as CM247 alloy, is more susceptible to strain age cracking when subjected to high-temperature welding than a lower aluminum-titanium content X-750 superalloy. The finished turbine blade alloys are typically strengthened during post casting heat treatments which render them difficult to perform subsequent structural welding. Currently used welding processes for superalloy structural fabrication or repair generally involve substantial melting of the substrate adjoining the weld preparation, and complete melting of the welding rod or other filler material added. When a blade constructed of such a material is welded with rods of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

A past attempt to perform traditional "spot" electric resistance welding of superalloys, as shown in FIG. 2, in a heat resistance joining apparatus 20, by passing current between compressed electrodes 22, 24 into a pair of abutting superalloy components 30, 32, also caused solidification cracking within the weld zone 34. Alternative superalloy welding processes, including laser microcladding with chill fixtures, welding in so-called "hot" boxes at elevated temperatures, and inertia friction welding may still lead to post weld heat treatment strain age cracking. Other friction welding processes, such as friction stir welding, can reduce superalloy cracking propensity, but the employed welding apparatus has relatively limited tool life. The same cracking concerns occur during superalloy component fabrication, when separate components constructed of superalloy material are joined by welding processes.

In comparison to structural repair or fabrication, "cosmetic" repair or fabrication of superalloys is recognized as replacing damaged material (or joining two components of newly fabricated material) with unmatching alloy material of lesser structural property specifications, where the localized original structural performance is not needed. For example, cosmetic repair may be used in order to restore the repaired component's original profile geometry. As noted above, it is desirable to perform structural repairs on surface cracks in order to reduce their likelihood of subsequent spreading when the component is returned to service. Conversely, an example of cosmetic repair is for filling surface pits (as opposed to structural cracks) on a turbine blade airfoil in order to restore its original aerodynamic profile, where the blade's localized exterior surface is not critical for structural integrity of the entire blade. Cosmetic repair or fabrication is often achieved by using oxidation resistant weld or braze alloys of lower strength than the blade body superalloy substrate, but having higher ductility and lower application temperature that does not negatively impact the superalloy substrate's material properties.

Given the shortcomings of superalloy structural repair welding, often the only commercially acceptable solution is to scrap damaged turbine blades that require structural repair, because past experience has shown limited success of such structural repairs. Thus repairs have been limited to those that have in the past been proven to be performed successfully by alternative superalloy welding processes described above, or by cosmetic welding, employing more ductile welding rod filler materials with reduced structural strength.

Thus, a need exists in the art for a method for performing structural joining or repairs on surfaces of superalloy components, such as turbine vanes and blades, so that subcomponents can be joined, or that structural cracks and other surface defects can be repaired.

Another need exists in the art to increase successful rates of structural repairs on surfaces of superalloy components, such as turbine vanes and blades, so that damaged blade scrap rates can be reduced.

Yet another need exists in the art for a method for performing structural joining or repairs on surfaces of superalloy components, such as turbine vanes and blades, with proven, repeatable repair techniques and machinery, that do not require complex welding or post-repair heat treatment procedures.

SUMMARY OF THE INVENTION

Accordingly, an object of the invention is to perform structural joining or repairs on surfaces of superalloy components, such as turbine vanes and blades, so components can be joined, or that structural cracks and other surface defects can be repaired.

Another object of the present invention is to increase the likelihood of performing successful structural repair of superalloy components, such as turbine vanes and blades, so that damaged component scrap rates can be reduced.

Yet another object of the present invention is to perform structural fabrication or repair of superalloy components, such as turbine blades or vanes, with proven, repeatable repair techniques and machinery, that do not require complex welding or post-repair heat treatment procedures.

These and other objects are achieved in accordance with the present invention embodiments by structurally joining superalloy components, or repairing defects in superalloy material components, such as turbine blades or vanes. In repair embodiments, the surface defect is removed from the component substrate by electric discharge machining or other known metal working process, forming an excavated recess. A repair splice is formed, preferably of a same material with similar mechanical structural properties, having a mating projection with profile conforming to the corresponding recess profile. The repair splice is inserted and captured within the recess so that they abut each other along a contact surface. The splice and substrate are resistance heated under compression pressure until localized melting occurs along the contact surface, so that they are mutually affixed. A repair alloy may be interposed between the splice and recess substrate prior to resistance heating.

The present invention features joined superalloy components including a substrate defining recess having a recess profile; and a mating superalloy splice having a splice projection captured within the substrate recess, with a projection profile conforming with the substrate profile along a contact surface within the recess. The substrate and splice are affixed to each other along the contact surface by the process of electric resistance welding by: compressing the substrate and splice projection together along the contact surface at a selected pressure; conductively contacting the substrate and splice with separate electric resistance welding electrodes; passing current at a selected flow rate and application time period through the substrate and splice projection between the electrodes until localized melting occurs along the contact surface, and ceasing further current flow after the substrate and splice projection are mutually affixed to each other.

The present invention also features a method for joining superalloy components by forming a recess in a superalloy component substrate having a recess profile defined by the remaining substrate; and forming a mating superalloy splice having a splice projection, with a projection profile conforming with the substrate recess profile along a corresponding contact surface. The splice is inserted and captured within the recess, so that the projection and recess are in abutting contact along the contact surface. The substrate and splice projection are compressed together along the contact surface at a selected pressure. Thereafter the substrate and splice are conductively contacted with separate electric resistance welding electrodes. Current is passed at a selected flow rate and application time period through the substrate and splice projection between the electrodes until localized melting occurs along the contact surface. Current flow is ceased after the substrate and splice projection are mutually affixed to each other.

The present invention also features a method for repairing a superalloy component, comprising: removing a damaged portion of superalloy component substrate and forming an excavated recess therein having a recess profile defined by the remaining substrate. A mating superalloy repair splice having a splice projection, with a projection profile conforming with the substrate recess profile along a corresponding contact surface is formed. A weld alloy is interposed between the recess and repair splice along the contact surface. The repair splice is inserted and captured within the recess, so that the projection and recess are in abutting contact along the contact surface. The substrate and splice projection are compressed together along the contact surface at a selected pressure with a pair of opposed electric resistance welding electrodes. Thereafter, current is passed through the joined superalloy components at a selected flow rate and application time period, through the substrate and splice projection between the electrodes until weld alloy localized melting occurs along the contact surface, further current flow is ceased until after the substrate and splice projection are mutually affixed to each other.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized for mechanical structural joining/repair of superalloy components. In some embodiments, the teachings of the present invention can be readily utilized for structural repair of superalloy material turbine blades and vanes of the type used in steam or gas turbines, by use of splice inserts, in a manner that does not significantly reduce mechanical structural or material properties of the joined or repaired blade. In the present repair method, the damage is removed, forming an excavated recess. A repair splice is formed of a same material with similar mechanical structural properties, having a mating outer profile conforming to the corresponding recess profile. The repair splice is inserted and captured within the recess, so that the blade body and repair splice are in abutting contact along a contact surface. The splice and abutting substrate are compressed under pressure and locally heated with an electric resistance heating welding apparatus, until localized melting occurs along the contact surface, so that they are mutually affixed. The repaired component's overall mechanical structural properties are similar to those of an undamaged component. The repair methods of the present invention do not require complex welding or heat treatment procedures, and use known electric resistance heating welding equipment and affixation processes. In addition to performing repairs, the joining methods of the present invention may be used to fabricate superalloy structures by joining subcomponents.

Figure 1:
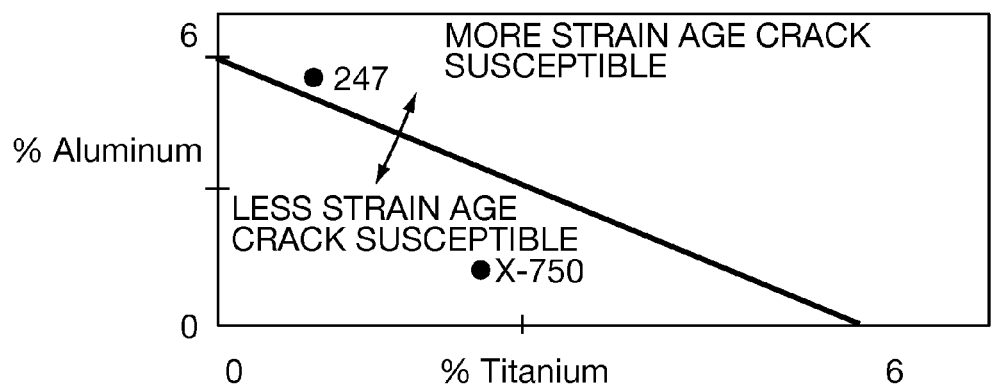
FIG. 1 is a chart showing superalloy post weld age cracking susceptibility, as a function of titanium and aluminum content in the alloy.
Figure 2:
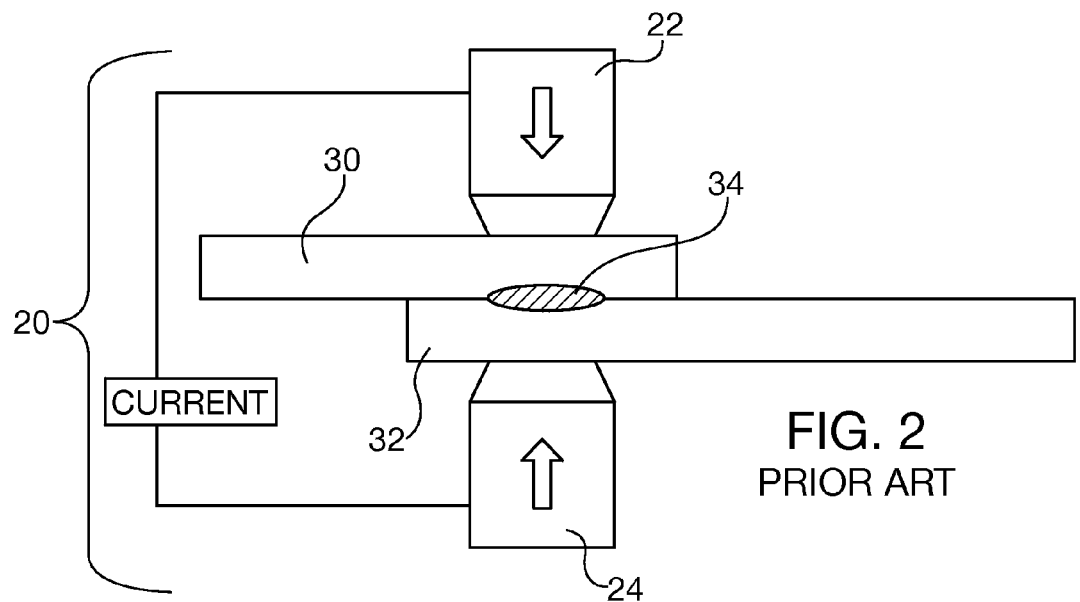
FIG. 2 is a schematic elevational view of prior art electrical resistance heating spot welding apparatus.
Figure 3:
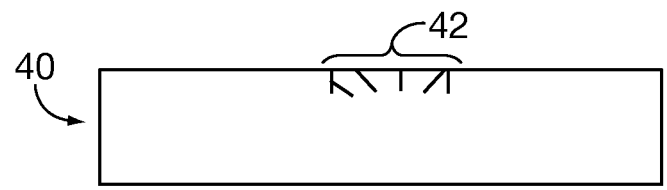
FIG. 3 is a schematic elevational view of a superalloy component having a surface defect in need of repair.

FIG. 3 shows an exemplary superalloy component 40 having surface stress or e.g. thermomechanical fatigue cracks 42. If the stress cracks are not structurally repaired (i.e., by mere cosmetic repair with relatively softer, lower application temperature welding or brazing alloys) there is a possibility that the cosmetically repaired cracks will re-crack and/or continue to spread within the component 40 substrate.

Figure 4:
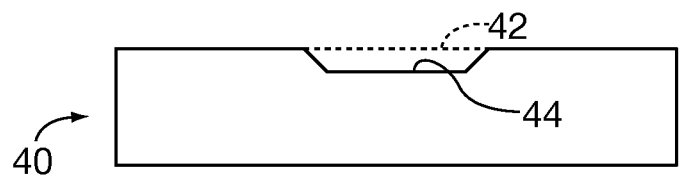
FIG. 4 is a schematic elevational view of a surface defect in a superalloy component being repaired in accordance with an embodiment of the present invention by excavating a damaged portion thereof.

In the repair method of the present invention cracked regions 42 of the component substrate 40 are excavated by electric discharge machining (EDM) or other known metal removal processes, leaving a recess 44 in the uncracked substrate, as shown in FIG. 4. The recess 44 profile is defined by the remaining margins of the uncracked substrate 40. While a trapezoidal cross-sectional profile recess 44 is shown in FIG. 4, other cross-sectional profile configurations may be utilized, such as vee-shaped or arcuate-shaped profiles formed by cutting tool heads or EDM. The recess length (normal dimension in and out of the figure) may be varied. Suitable plan view profiles for recess 44 include circular symmetrical, square and rectangular profiles. When fabricating a new composite superalloy structure, two superalloy subcomponents are fabricated with mating recess and projection profiles and structurally joined under pressure, with heat being applied to the contact surfaces of both subcomponents with an electric resistance welding apparatus. It is also possible to fabricate a composite structure that does not have mating recess and projection portions by abutting two components relative to each other without any mating projection and recess.

In known repair or fabrication methods, recess 44 would have been filled by heat application of softer filler material (cosmetic repair) or by filler material of similar hardness. As previously discussed, other welding techniques applying superalloy filler generally induce undesirable cracks in the superalloy component during welding or during subsequent post-welding heat treatment.

Figure 5:
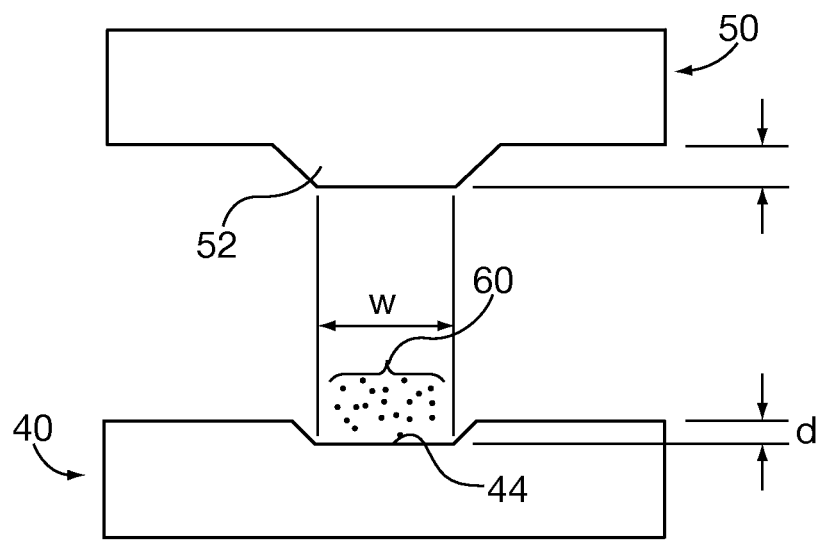
FIG. 5 is a schematic elevational view of a surface defect in a superalloy component being repaired in accordance with an embodiment of the present invention by replacing the damaged portion with a repair splice.

The present invention differs from prior known replacement of superalloy material in cracks or formed recesses by inserting a repair splice 50, preferably constructed of the same or of a superior superalloy material with similar material properties as the repaired component, as shown in FIG. 5. The repair splice 50 has a projecting portion 52 with a profile that conforms and mates with the recess profile 44. As discussed above, new subcomponents having mating projection and recess portions may be joined to fabricate a new component by the same method.

A bonding filler alloy 60 may be interposed between the mating recess 44 and projection 52 to aid their respective joining during subsequent resistance heating processes. Filler alloy is chosen for compatibility with the chosen resistance heating bonding/joining process. Welding filler alloys likely will have similar melting temperatures to the base metals. While powdered bonding filler 60 is shown schematically in FIG. 5, other forms of known filler may be applied, including by way of non-limiting example solid preshaped/preformed ring, foil or ribbon filler, granular filler, or filler paste. Filler alloy dimensions (e.g., powder mesh size) may be varied to optimize resistance heating heat transfer flux concentration, in conjunction with current application rates and time, so that desired melting or partial melting is achieved between the joined superalloy components 40, 50. Known flux agents and/or activators (e.g., borane-dimethylamine) may be applied, as a separate material or mixed within the filler. The filler material may include powdered or other constituency superalloy material base metals of the type used to construct the superalloy components.

Figure 6:
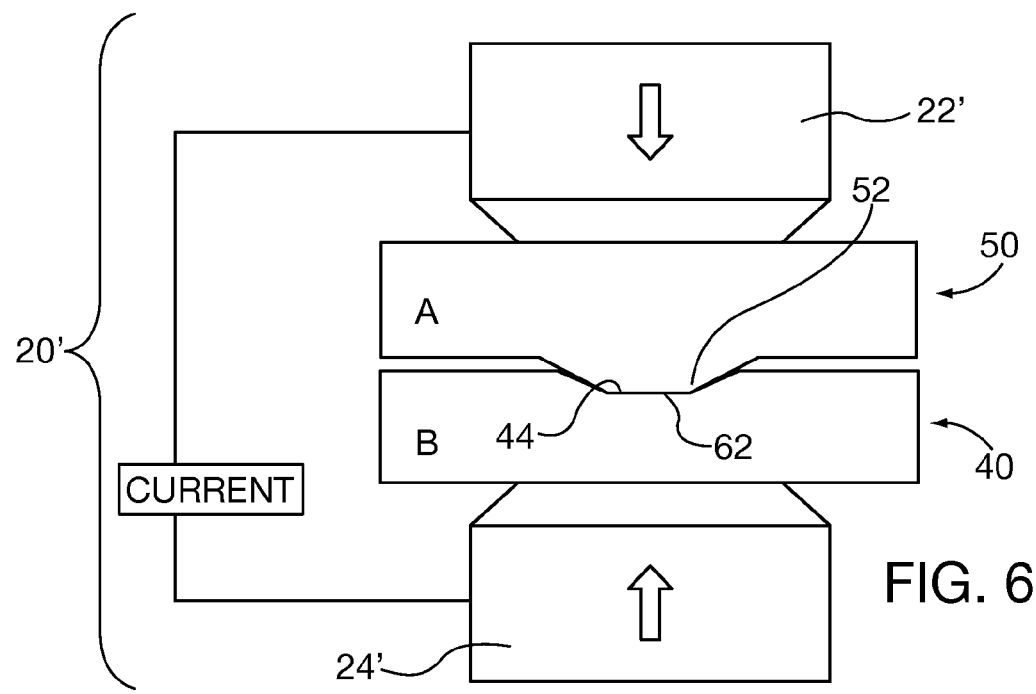
FIG. 6 is a schematic elevational view of a surface defect in a superalloy component being repaired in accordance with an embodiment of the present invention by affixing the repair splice to the component substrate by resistance heat welding the repair splice and substrate.

Referring to FIG. 6, the repair splice 50 is inserted into the repaired component substrate 40, with the mating projecting portion 52 abutting the recess 44 along a contact surface 62, capturing any filler material 60 therein. Thereafter the repair splice 50 and component substrate 40 are compressed relative to each other, with pressure being concentrated along the contact surface 62. While the mating repair splice 50 and component substrate 44 are being compressed, a known type of welding resistance heater 20' passes current between electrodes 22', 24', with heat transfer being concentrated along the contact surface 62. While the resistance heater of FIG. 6 places electrodes 22', 24' on opposing sides of the repair splice 50 and component substrate 44, those skilled in the art will appreciate that other electrode orientations may be used, that cause resistance heat transfer between the projecting portion 52 and recess 44 along the contact surface.

Similarly, a continuous seam weld longer than the electrode 22', 24' surface area can be formed by using longer, linear electrodes, rolling wheel electrode(s), a plurality of proximal electrodes oriented in an array or moving the electrodes serially and sequentially relative to the superalloy substrates 40, 50. Similarly, multiple recesses 44 and projecting portions 52 may be formed in superalloy components 40, 50 and subsequently joined by resistance heating tools sequentially and/or simultaneously in one or more subgroups.

Figure 7:
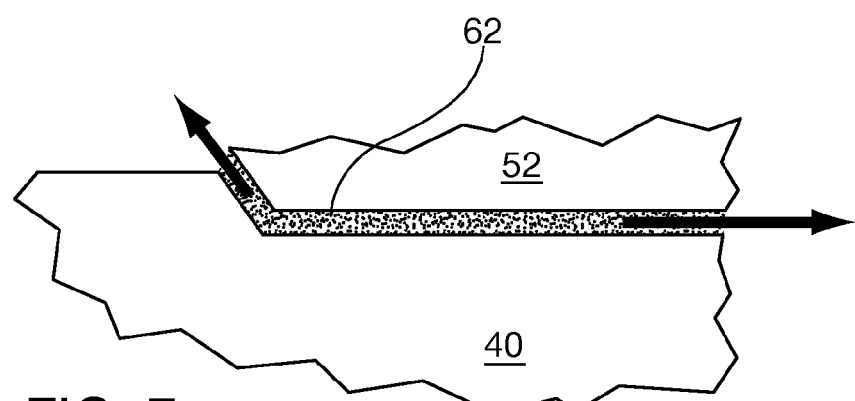
FIG. 7 is a detailed schematic elevational view of the resistance heating interface of FIGS. 6 and 7.

In performing the joining processes of the present invention, sufficient pressure and electric current are selectively applied to cause localized melting and affixation of the projecting portion 52 and recess 44 along the contact surface 62, but not excessive heat or pressure that will significantly alter material properties of the component substrate 40 or the splice 50 at any significant distance from the contact surface. Accordingly, localized heating is stopped when desired localized melting and affixation is achieved. Localized melting properties along the contact surface 62 are affected by the recess 44/projection 52 profile depth d and width W, as those dimensions (along with length) impact applied pressure per unit area and heat transfer flux. It is desirable to construct the contact surface profile so that its depth d is smaller than its width W, and with angled side walls, so that excess melted material is extruded from the contact surface 62 juncture, as shown in FIG. 7. A suitable recess 44 profile depth d to width W ratio is 1:3.

Figure 8:
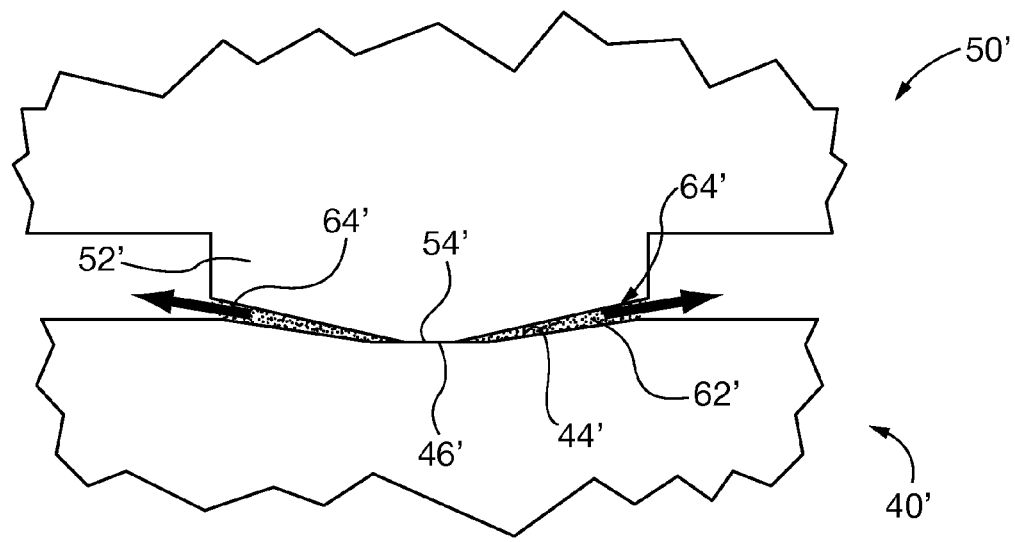
FIG. 8 is a detailed schematic elevational view of an alternative embodiment of resistance heating interface.

An alternate embodiment mating recess 44' and splice projection 52' profile is shown in FIG. 8. The splice projection 52' includes a projection tip 54' that conforms to and is in contact with the corresponding recess flat 46'. Outboard of the projection tip 54' and recess flat 46' the respective recess 44' and splice projection 52' profiles outwardly diverge to create a gap 64' to facilitate ejection of excess localized melted material 62' out of the recess 44', as shown schematically by the bold arrows in FIG. 8. In this exemplary embodiment of FIG. 8, the diverging gap 64' is bounded by forming the recess 44' outboard of the recess flat 46' at an included angle greater than the included angle of the projection 52' outboard of its respective projection tip 54'.

In conventional resistance welding without projection (52, 52') and without recess (44, 44'), a nugget is formed that is subject to excessive shrinkage stresses during solidification. That is, surrounding material in the unmelted substrate is not free to yield to accommodate shrinkage stresses during solidification of the thereby trapped nugget. Projection welding success is likely enhanced if nearly all molten metal 62, 62' is ejected from the interface between the recess and the splice projection to thereby minimize shrinkage stresses. The adjoining outboard geometry preferably allows for such ejection of material. Also the projection tip 54' may be shaped to initiate melting at the center of its tip and to promote an outwardly directed, advancing melt front that enhances such projection of molten metal 62' in a symmetric pattern.

Figure 9:
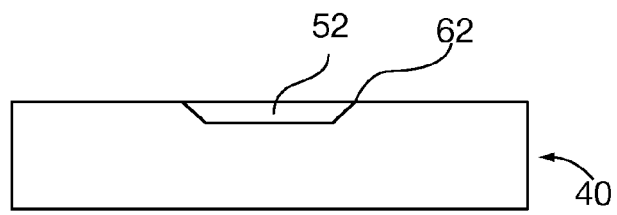
FIG. 9 is a schematic elevational view of a superalloy component repaired in accordance with an embodiment of the present invention.

After desired localized melting along the contact surface 62 is achieved, resistance heating ceases and the now mutually affixed component substrate 40 and repair splice 50 are allowed to cool for subsequent removal from the resistance heating apparatus 20'. The repair splice 50 and extruded material along the contact surface 62 are conformed to the surrounding surface profile, restoring the repaired component 40 to its original condition, shown in FIG. 9. The now repaired component 40 no longer has surface damage, which is replaced by fresh repair splice material 52, having substantially similar material properties to the original substrate material. Specifically, surface hardness and, strength properties within the splice are substantially similar to those of the original surrounding material. Mechanical or thermally induced stresses within the component 40 can be transferred across the contact surface to the splice, due to their mechanically and thermally abutting relationship. Relative affixation between the repaired component substrate 40 and the splice 50 along the contact surface 62 is sufficient to maintain structural integrity.

The localized affixation along the contact surface 62 does not significantly negatively impact structural material properties of the repaired component substrate 40 and the splice 50. Limited post repair heat treatment (if any is required) minimizes—if not totally eliminates—subsequent risk of repaired component strain age cracking. Thus, time and expense of superalloy component fabrication or repair may be undertaken with the repair methods of the present invention, without undue risk of repair failure. In the power generation field, surface cracked turbine blades may be repaired without the need to scrap and replace them with new blades.

Different known resistance heating methods may be employed to join the mating superalloy components. Suitable resistance heating methods include resistance spot welding and resistance seam welding. Application of relatively high compressive pressures on the superalloy components during resistance heating may also achieve solid state bonding. Resistance heating joining/bonding may be carried out in ambient air, or alternatively in isolated vacuum, inert gas or active gas environments. Resistance heating joining/bonding may also be carried out under pressure such as within a hot isostatic pressure (HIP) furnace wherein minute defects may be shown to close or heal. As noted above, the resistance heating joining/bonding may be performed with filler alloy, flux and/or activator compositions that are compatible with the selected heating process. In any of the selected resistance heating methods the overall objective is to achieve localized bonding between the superalloy subcomponents along the contact surface 62 and ceasing additional heat input, without significantly impacting the superalloy material properties within the generalized substrate of either subcomponent. Unlike known welding techniques that tend to liquefy the respective superalloy substrates (and thus negatively alter material properties making them susceptible to subsequent cracking), the resistance heating application in the present invention avoids gross changes in the superalloy substrates.

When practicing the present invention, superalloy components can be joined or repaired with known proven equipment. Damaged superalloy component material can be removed and repair splices fabricated by electric discharge machining or other known metal cutting techniques. Known electric resistance heating welding machinery and techniques may be employed to affix repair splices to their mating recesses. The splice-repaired superalloy component external surface profile can be restored to original profile specifications by grinding or cutting the repair splice and surrounding contact surface to match the repaired component's local profile.

While the structural joining of superalloy components exemplary embodiments herein have been primarily described with reference to superalloy component repair, the same methods may be used to fabricate superalloy structures by joining subcomponents. For example, a projection on one superalloy subcomponent may be affixed to a recess on another superalloy subcomponent.

Although various embodiments which incorporate the teachings of the present invention have been shown and described in detail herein, those skilled in the art can readily devise many other varied embodiments that still incorporate these teachings.

What is claimed is:

1. A method for joining superalloy structures, comprising:
   forming a recess in a superalloy component substrate having a recess profile defined by the remaining substrate;
   forming a mating superalloy splice having a splice projection, with a projection profile conforming with the substrate recess profile along a corresponding mutual contact surface;
   inserting and capturing the splice within the recess, so that the projection and recess are in abutting contact along the contact surface;
   compressing the substrate and splice projection together along the contact surface at a selected pressure;
   conductively contacting the substrate and splice with separate electric resistance welding electrodes;
   applying selected compression pressure and passing current at a selected flow rate and application time period through the substrate and splice projection between the electrodes until localized melting occurs along the contact surface, ejecting a volume of localized melted material out of the mutual contact surface that avoids, or crack-inducing shrinkage stresses or solidification cracking during post-weld cooling, ceasing further current flow after the substrate and splice projection are mutually affixed to each other along the contact surface and;
   wherein the recess and splice projection conforming profiles form an outwardly diverging gap for initiating melting proximate a narrower portion of the gap, and for promoting melt front formation and ejection outwardly towards a wider portion of the gap and out of the recess during said ejecting;
   avoiding, after cessation of current flow, crack-inducing shrinkage stresses or solidification cracking during subsequent contact surface cooling or during post-weld heat treatment.

2. The method of claim 1, wherein the recess forming step is performed by electric discharge machining.

3. The method of claim 1, wherein during the recess forming step, the recess so formed comprises a blind recess formed partially within the component substrate thickness for engagement with a mating projecting portion formed in the splice.

4. The method of claim 1, wherein during the recess and splice forming steps, the recess and splice projection mating profiles so formed only allow unidirectional insertion of the splice.

5. The method of claim 1, wherein during the recess and splice forming steps the recess and splice projection mating profiles so formed are planar.

6. The method of claim 1, further comprising interposing weld filler alloy between the recess and splice projection along the contact surface before the compressing step.

7. The method of claim 6, wherein the substrate and splice are constructed of a same material with substantially similar elongation, yield strength and tensile strength mechanical structural properties, affixed to each other with weld alloy that upon its melting and ejection maintains at least seventy percent (70%) of the substrate and splice material original specification elongation, yield strength and tensile strength within the joined structure welded contact surface, said weld filler alloy chosen to enhance resistance welding heat flux concentration therein and along said contact surface during said current passing.

8. The method of claim 7, wherein the repaired component substrate is selected from the group consisting of turbine blades and turbine vanes.

9. The method of claim 1, further comprising conforming a profile of an exterior facing surface of the splice with that of the surrounding substrate.

10. A method for repairing a superalloy component, comprising:

removing a damaged portion of superalloy component substrate and forming an excavated recess therein having a recess profile defined by the remaining substrate;

forming a mating superalloy repair splice having a splice projection, with a projection profile conforming with the substrate recess profile along a corresponding mutual contact surface, wherein the recess and splice projection conforming profiles form an outwardly diverging gap;

interposing weld filler alloy between the recess and repair splice along the contact surface;

inserting and capturing the repair splice within the recess, so that the projection and recess are in abutting contact along the contact surface;

compressing the substrate and splice projection together along the contact surface at a selected pressure with a pair of opposed electric resistance welding electrodes; and applying selected compression pressure and passing current at a selected flow rate and application time period through the substrate and splice projection between the electrodes until weld alloy localized melting occurs along the contact surface, ejecting a volume of localized melted material out of the mutual contact surface that avoids, or crack-inducing shrinkage stresses or solidification cracking during post-weld cooling, ceasing further current flow after the substrate and splice projection are mutually affixed to each other along the contact surface and;

wherein the recess and splice projection conforming profiles form an outwardly diverging gap for initiating melting proximate a narrower portion of the gap, and for promoting melt front formation and ejection outwardly towards a wider portion of the gap and out of the recess during said ejecting;

avoiding, after cessation of current flow, crack-inducing shrinkage stresses or solidification cracking, during subsequent contact surface cooling or during post-weld heat treatment.

11. The method of claim 10, wherein the substrate and repair splice are constructed of a same material with substantially similar mechanical structural properties, affixed to each other using weld alloy that upon its melting and ejection does not substantially change said structural properties, maintaining at least seventy percent (70%) of the substrate and splice elongation, yield strength and tensile strength within the joined structure welded contact surface, said weld filler alloy chosen to enhance resistance welding heat flux concentration therein and along said contact surface during said current passing.

12. The method of claim 11, wherein during the interposing step the weld filler alloy is selected from the group consisting of a powdered weld alloy, solid preshaped/preformed ring, foil or ribbon weld alloy, granular weld alloy, or paste weld alloy.

13. The method of claim 12, further comprising interposing an activator between the recess and repair splice along the contact surface during the interposing step.

* * * * *